April 21, 1970   N. H. POLAKOWSKI   3,507,135
METHOD AND APPARATUS FOR FORMING THIN METAL BELTS
Filed March 14, 1968   2 Sheets-Sheet 1

INVENTOR
Natalis H. Polakowski
by McDougall, Hersh, Scott
and Ladd
Attys

United States Patent Office 3,507,135
Patented Apr. 21, 1970

3,506,135
METHOD AND APPARATUS FOR FORMING THIN METAL BELTS
Natalis H. Polakowski, 226 Laurel Ave., Wilmette, Ill. 60480
Filed Mar. 14, 1968, Ser. No. 713,011
Int. Cl. B21b 19/14
U.S. Cl. 72—110                              3 Claims

ABSTRACT OF THE DISCLOSURE

The forming of thin metal belts from blanks of tubular material which includes inserting a pair of rolls of which at least one is a stretch roll of relatively small diameter through the interior of said tubing, engaging the tubing— stretch roll assembly between a pair of work rolls of large diameter rotatable about an axis parallel to each other and the stretch rolls, advancing one work roll in the direction towards the other to engage and roll the tubing between the stretch rolls and the work rolls and effect a displacement of the inserted rolls against the tension in the tube wall in the direction away from each other while rotating the work rolls thereby thinning and stretching the tubing to form a continuous belt.

---

The invention relates to a process and equipment for the conversion of sections of seamless or welded tubing into endless cylindrical belts of almost any width or length.

Belts of the type described have heretofore been sought to be manufactured from lengths of thin strip of metal welded end to end. Belts thinner than 0.010″ are most difficult to produce in this manner owing to the near impossibility of securing and maintaining a desirable coplanar butting of the two end edges during welding, the residual stresses and distortions resulting from welding, and the undesirable grain structure and mechanical weakness in the weld region. Finally, if a virtually seamless and smooth surface condition is desired, a planishing of the weld bead to the required degree of perfection is extremely difficult with material as thin as 0.005″.

It is an object of this invention to provide a method and means for producing endless metal belts of the type described which are not subject to the objectionable features heretofore described; which enable thin and wide belts with virtually perfect surfaces to be produced in a simple way; which make use of simple and readily available or else adaptable equipment.

These and other objects and advantages of this invention will hereinafter appear and for purposes of illustration, but not of limitation, an embodiment of the invention is shown in the accompanying drawings in which.

In accordance with the practice of this invention, one starts with a blank in the form of a length of thin walled, welded or seamless tubing 1, such as a tube section having a wall thickness of 0.016″ to 0.025″. If the blank is a welded tube section, the weld should be planished, this being a common and easy operation with tubing of the described thickness. The length of blank is selected to correspond to or preferably slightly exceed the width of the belt desired to allow for side trimming of the finished product.

Figure 1:
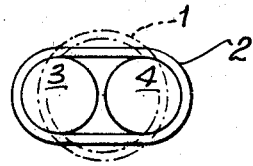
FIG. 1 is a schematic end elevational view of the belt blank mounted about a pair of stretch rolls.

As illustrated in FIG. 1, the first step is to partially flatten the blank 1 to an oblong shape 2, as by any conventional means, such as between platens or press plates, rolls or the like. Next, a pair of stretch rolls 3 and 4 is inserted in the oblong-shaped blank with the stretch rolls having a length exceeding the length of the blank and a diameter which enables the pair of rolls to be easily inserted into the blank.

The assembly is positioned between a pair of work rolls 5 and 6 of a rolling mill with the axis of the stretch rolls 3 and 4 roughly parallel to the axes of the work rolls 5 and 6 which are substantially larger in diameter than the stretch rolls. Stretch rolls 3 and 4 need to be supported at their ends only against axial displacement.

One or both of the work rolls are mounted to enable movement perpendicular to its axis in the direction towards the other, as by means of a screwdown, to engage the opposite exterior sides of the blank in the area between the stretch rolls to compress the blank in the middle to a peanut-like shape thereby trapping the stretch rolls 3 and 4 in a positive manner.

The rolls 5 and 6 are equipped with a drive system for rotation of both in the same direction but with means to enable variation in their speed ratio to compensate for possible differences in thickness and linear speeds of the top and bottom surfaces of the blank, as it is being worked by the four-roll combination. The purpose of this is to insure proper torque distribution among the work rolls.

Figure 2:
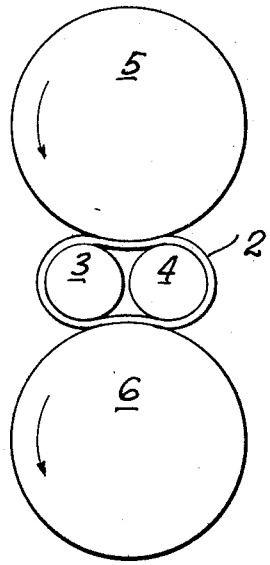
FIG. 2 is a schematic end elevational view of the arrangement of elements at the beginning of the operation of belt formation from the blank of FIG. 1.
Figure 3:
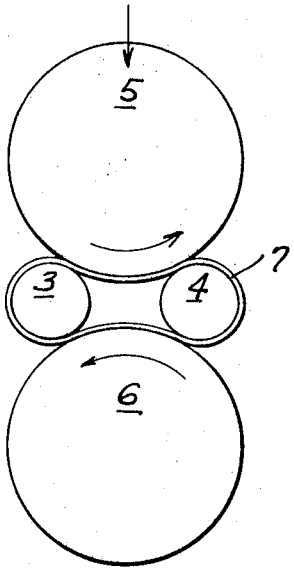
FIG. 3 is a view similar to that of FIG. 2 showing the relative positions of the elements during a subsequent stage of belt manufacture.

When the mill is set in motion, and the work rolls 5 and 6 are progressively moved towards one another with concurrent rotation about their axes, the blank 1 is first engaged and then gradually elongated by rolling pressure between the large work rolls 5 and 6 and the much smaller stretch rolls 3 and 4 which are, at the same time, forced outwardly to increase the spaced relationship therebetween and thereby intrinsically producing the required tension for rolling down and stretching the tubing. The entire rolling assembly progressively assumes the forms shown in FIGS. 2 and 3 with the belt blank 1 elongating and thinning from condition 2 in FIG. 2 to condition 7 in FIG. 3.

The limiting condition with a roll system is achieved when the top and bottom inside faces of the belt being rolled are about to come into contact one with the other because of the mutual proximity of the work rolls 5 and 6.

Figure 4:
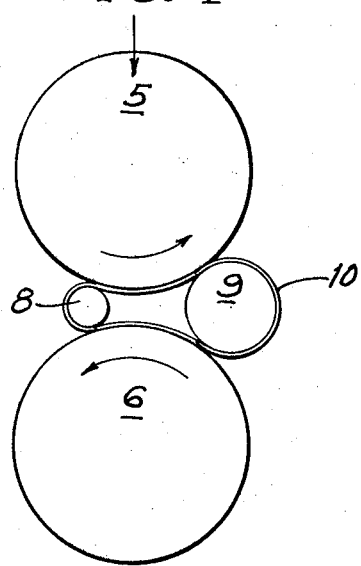
FIG. 4 is a view similar to those of FIGS. 1 and 2 showing a modification in the arrangement of elements for a further increase in the length of belt.

If more elongation is desired, the configuration can be changed to FIG. 4 wherein a much larger roll 9 is substituted for roll 4, with a thinner stretch roll 8 preferably, though not necesarily, substituted for roll 3. This operates to take up the slack and to enable the rolling reduction to be continued by again effecting displacement of one or both of the work rolls in the direction towards each other to again force the new combination of rolls 8 and 9 in the direction away from each other to thin and stretch the blank.

Figure 5:
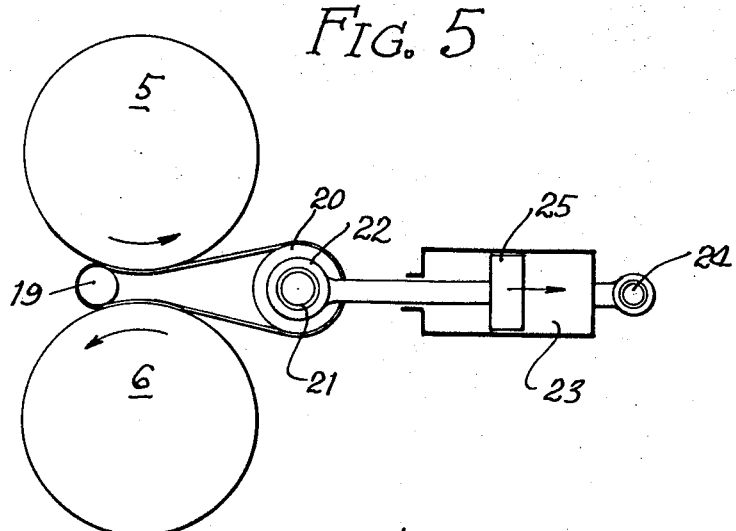
FIG. 5 is an elevational view showing the arrangement of elements to achieve a still further increase in the length of belt.

To obtain still longer and thinner belts, the arrangement of the equipment can be changed to that indicated in FIG. 5, in which only one thin stretch roll 19 is inserted for roll 3 in a position offset to one side of the plane containing the work roll axes but operatively engaged with said work rolls while the required tension in the belt is provided by tensioning roller 20 located inside the belt being rolled but on the opposite side of the plane containing the axes of the work rolls 5 and 6. Roll 20 is end-supported on bearings which are constantly urged in the direction away from the roll cluster, as by hydraulic cylinder 23 attached at one end to a fixed pivot 24 while acting on roll 20 through the piston and rod 25, bearings 22, and journals 21, thereby taking up the increasing length of the belt as the latter is progressively rolled out between rolls 5, 19 and 6.

The arrangement in FIG. 5 can be used directly to roll the tubular blank into a belt when such blank is sufficiently large and flexible initially and in this case the stages illustrated in FIGS. 1 through 4 can be omitted altogether. For instance, when the tubular blank was a welded tube 5″ O.D. by 0.020″ wall thickness, the equipment in FIG. 5 can be used directly to produce a belt about 45″ long by approximately 0.007″ thick.

The belt can be annealed at any stage of the operation so that a product of the required temper is ultimately obtained.

Figure 6:
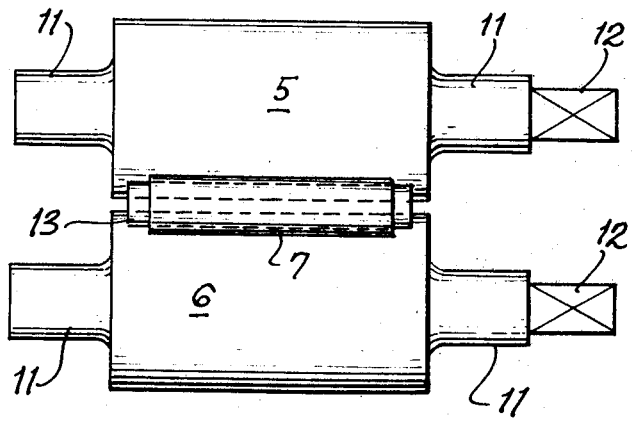
FIG. 6 is a front elevational view showing the elements employed in the practice of this invention.

FIG. 6 is a front elevational view of the equipment in which 12 is the belt, 13 the stretch roll, 10 and 11 the journals and wabblers, respectively, of the work rolls 5 and 6.

Figure 7:
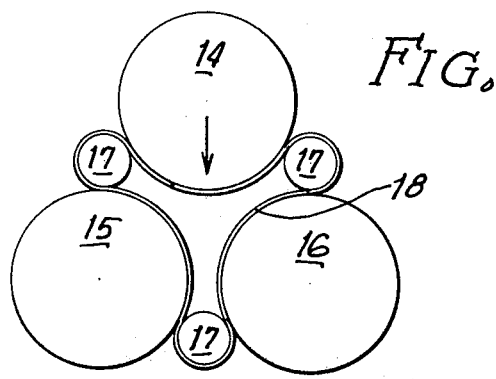
FIG. 7 is an end elevational view showing a modification in the arrangement of elements employed in the practice of this invention.

Another arrangement capable of use in the practice of this invention is shown in FIG. 7 wherein use is made of three work rolls 14, 15 and 16 mounted for rotational movement about axes arranged at the apices of a roughly equilateral triangle with three stretch rolls 17 of small diameter between adjacent pairs of work rolls and about which the belt 18 is threaded to effect the described elongation and thinning of the belt as the rotating work rolls 14 to 16 are displaced inwardly in the direction towards the common axis.

When rolled to the desired length, the belt is removed from between the rolls. It will be found that the endless belt will be of substantially uniform wall thickness, having a high degree of surface smoothness and flexibility and without any apparent weld or joinder lines.

It will be understood that changes may be made in the details of construction, arrangement and operation without departing from the spirit of the invention, especially as defined in the following claims.

I claim:

1. Apparatus for forming metal belts from tubular blanks comprising a pair of large diameter work rolls, means mounting the work rolls for rotational movement about parallel axes and for relative movement of at least one of the work rolls in the direction toward and away from the other, a pair of stretch rolls of smaller dimension than the work rolls and dimensioned to be insertable through the tubular blank, means mounting the stretch rolls for rotational movement about axes substantially parallel with the axes of the work rolls with one stretch roll offset to one side of a line drawn between the axes of the work rolls and the other stretch roll offset in the opposite direction from said line, said means mounting the stretch rolls including means for displacement of one or both of the stretch rolls in the direction towards and away from the other for varying the spaced relationship therebetween, and means for driving the work rolls in rotational movement and means for displacement of at least one of the work rolls in the direction towards the other during rotational movement of the rolls.

2. Apparatus for forming metal belts from tubular blanks comprising a pair of large diameter work rolls mounted for rotational movement about parallel axes and for relative movement of at least one of the work rolls in the direction toward and away from the other, one stretch roller of a diameter much smaller than that of the work rolls and dimensioned to be insertable through the tubular blank, means for mounting the stretch roll for rotational movement about an axis substantially parallel to the axes of the work rolls in a position offset to one side of the plane containing the axes of the work rolls, said means mounting the stretch roll including means to allow displacement toward and away from said plane, a tensioning roller of larger diameter than the stretch roll but insertable into the tubular blank together with the stretch roll, means for mounting said tensioning roller on the opposite side of the plane containing the work roll axes in a position parallel to said axes and with means to urge it away from the stretch roll to enable the necessary tension in the tubular blank to be developed when the work rolls are set sufficiently close to one another to prevent the stretch roll from passing in between them, means for rotationally driving the work rolls, and means for displacement of at least one of the work rolls in the direction toward the other while the rolls rotate.

3. A method for forming thin flat metal belts from metal tubing of much smaller diameter comprising inserting at least two stretch rolls of relatively small diameter through the interior of said tubing, engaging the tubing-stretch roll assembly between a pair of work rolls of large diameter rotatable about an axis parallel to each other and the stretch rolls, advancing one work roll in the direction towards the other to engage the tubing between at least one stretch roll and the work rolls and effect rolling and thinning of the tubular blank while displacing the stretch rolls in the direction away from each other thereby keeping the tube wall under tension while it is rolled.

References Cited

UNITED STATES PATENTS 1,618,515    2/1927    Coryell _____ 72—205

LOWELL A. LARSON, Primary Examiner

U.S. Cl. X.R.

72—205, 208